United States Patent [19]

van de Griend

[11] Patent Number: 4,623,812
[45] Date of Patent: Nov. 18, 1986

[54] ELECTRIC MOTOR WITH THIN ROTOR-DAMPING LAYER

[75] Inventor: Jan M. van de Griend, Dordrecht, Netherlands

[73] Assignee: U.S. Philips Corporation, New York, N.Y.

[21] Appl. No.: 708,751

[22] Filed: Mar. 6, 1985

[30] Foreign Application Priority Data

Mar. 12, 1984 [NL] Netherlands .......... 8400780

[51] Int. Cl.⁴ .............................. H02K 1/22
[52] U.S. Cl. ................... 310/268; 310/51; 310/261; 310/43
[58] Field of Search ............. 310/261–269, 310/51, 42, 43, 44

[56] References Cited

U.S. PATENT DOCUMENTS

| | | | |
|---|---|---|---|
| 2,220,751 | 11/1940 | Bergman | 310/51 X |
| 2,488,729 | 11/1949 | Kooyman | 310/261 UX |
| 2,727,368 | 12/1955 | Morton | 310/211 |
| 3,444,402 | 5/1969 | Cartier | 310/43 |
| 3,459,978 | 8/1969 | Trucks et al. | 310/51 |
| 3,459,982 | 8/1969 | Cartier | 310/43 X |
| 3,483,407 | 12/1969 | Frohmüller | 310/51 |
| 3,502,924 | 3/1970 | Staebler | 64/11 |
| 3,997,806 | 12/1976 | Noto et al. | 310/43 X |

FOREIGN PATENT DOCUMENTS

| | | |
|---|---|---|
| 0026100 | 1/1981 | European Pat. Off. . |
| 1538933 | 3/1970 | Fed. Rep. of Germany ........ 310/51 |
| 3008430 | 9/1981 | Fed. Rep. of Germany ........ 310/51 |
| 1062874 | 4/1954 | France . |
| 1101351 | 9/1955 | France . |
| 2345844 | 10/1977 | France . |
| 979541 | 1/1965 | United Kingdom . |

*Primary Examiner*—Mark O. Budd
*Attorney, Agent, or Firm*—David R. Treacy

[57] ABSTRACT

An electric motor has a rotor body elastically mounted on the shaft, the elastic mounting being relatively rigid in the axial direction. The shaft has an annular projection fitting in a circumferential recess in the bore of the rotor body. An elastic layer having a thickness which is small compared to the height of the annular projection is arranged at least between the circumferential surfaces of the annular projection and recess, and at least one radially extending face of the projection and recess.

9 Claims, 3 Drawing Figures

ELECTRIC MOTOR WITH THIN ROTOR-DAMPING LAYER

BACKGROUND OF THE INVENTION

The invention relates to an electric motor, comprising a stator, a motor shaft, and a rotor having a rotor body with a central bore, mounted on the motor shaft. The bore wall has an elastic layer which connects the rotor body to the motor shaft.

A d.c. motor of the above type is disclosed in German Auslegeschrift No. 2,328,886 and comprises a rotor body constituted by a permanent magnet. An axially directed layer of an elastic material in the form of a sleeve is arranged between the rotor body and the motor shaft to mount the rotor body elastically on the motor shaft. During operation, the elastic layer serves to absorb a part of the kinetic energy of the rotating rotor body when the rotor is suddenly braked, in order to reduce the load exerted on a gear wheel which is coupled to the motor shaft.

A disadvantage of this known electric motor is that elastic construction only performs a function when the rotor is suddenly braked. Another disadvantage is that the elastic layer is comparatively thick and therefore readily deformable in the axial direction, so that the fixation of the rotor on the motor shaft is not rigid in this direction, which may lead to impermissably large axial displacements of the rotor body relative to the rotor shaft.

SUMMARY OF THE INVENTION

The object of the invention is to provide an electric motor of the, which has relatively rigid coupling of the rotor to the shaft in the axial direction, but absorbs torsional vibrations.

According to the invention the electric motor is characterized in that the motor shaft comprises a circumferential annular projection which engages in a circumferential recess in the rotor body, the elastic layer being situated at least between the rotor body and the annular projection circumference and axial face which engage in the circumferential recess, the elastic layer having a thickness which is small relative to the radial height of the annular projection. The thickness is preferably no greater than 500 μm (0.020 inch).

In the electric motor in accordance with the invention the elastic layer comprises both axially directed portions and more or less radially directed portions, so that the layer has a larger effective surface area than in the known motor. This has the advantage that the thickness of the layer can be very small. This substantially precludes angular displacements between the rotor body and the motor shaft about axes perpendicular to the shaft axis.

Another advantage of the electric motor in accordance with the invention is that the substantially radially directed portions of the elastic layer preclude an axial displacement of the rotor body relative to the motor shaft, so that the rotor fixation is highly rigid in the axial direction. Preferably, the projection is of substantially rectangular cross-section and the recess generally has a corresponding cross-section.

The elastic layer may be made of an elastic material which is well known, such as rubber, for example butyl rubber or nitrile rubber. Very satisfactory results are obtained if the elastic layer is made of a thermoplastic polyurethane elastomer, for example the commercially available material Desmopane 485 or 487.

In electric motors of the type to which the invention relates the stator and the rotor are provided with first magnetic means and second magnetic means, respectively, which means cooperate with each other to rotate the motor shaft. The first magnetic means may comprise, for example, a radially magnetised permanent magnet and the second means may comprise, for example, a plurality of coils, the coils being energized with a specific frequency.

The electric motors intended here are in general comparatively compact and are employed in, for example, audio and video equipment, cameras and peripheral equipment for computers, such as floppy-disc drives. All these uses impose stringent requirements on the stability of the electric motor and on the variation in the motor-shaft speed. As a motor shaft rotates relative movement of the coils with respect to the magnetic poles gives rise to a torque ripple, which inevitably leads to irregularities in the speed of the motor-shaft. By means of electronic control systems, which are well known and not described herein, it is possible to reduce these speed variations. However, experiments have shown that by means of elastic mounting of the rotor bodies on the motor shaft, in the electric motor in accordance with the invention, such a reduction of the natural frequency of the rotary part of the electric motor and such a damping can be obtained that disturbances of the rotor rotation are hardly transmitted to the motor shaft. Thus, these electronic control systems may be dispensed with, at an attractive reduction of cost.

A preferred embodiment of the invention is characterized in that the annular projection forms part of a hub which is mounted on the rotor shaft, the elastic layer being affixed to the rotor body and to the hub.

The use of the hub is advantageous in the manufacture of the motor. For example, the motor shaft need not be mounted until the rotor is finished. This is particularly suitable if the rotor shaft has a large length, so that it is difficult to handle and to position during manufacture. Moreover, the risk of damage to the shaft during manufacture of the rotor is reduced substantially.

Another preferred embodiment is characterized in that on both sides of the recess, adjoining the control bore, the rotor body has an edge portion where the elastic layer continues from the recess and where the thickness of the layer is smaller than in the recess.

An advantage of this embodiment is that these thinner portions of the elastic layer lead to an increased radial stiffnes of the rotor.

The invention will be described in more detail, by way of example, with reference to the drawing.

DESCRIPTION OF THE PREFERRED EMBODIMENTS

Figure 1:
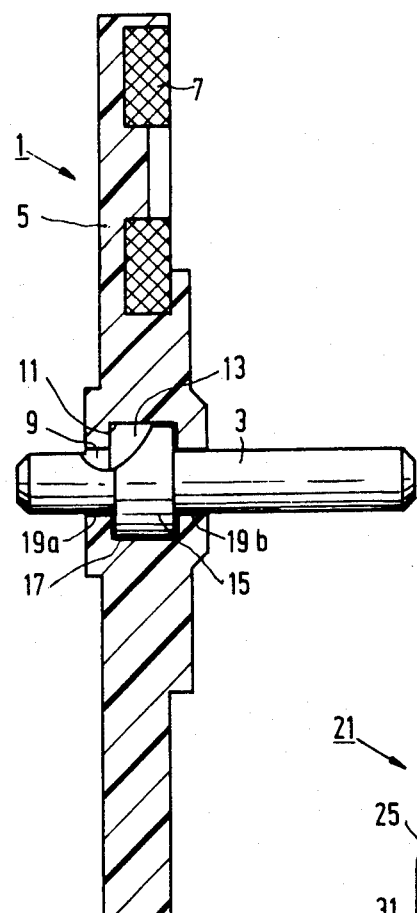
FIG. 1 is a sectional view of a rotor for use in a first embodiment of the invention.

The rotor 1 shown in FIG. 1 has a disc-shaped rotor body 5 mounted on a rotor shaft 3. Five coils 7, of which only one coil is shown, are embedded in the rotor body 5 which is made of a plastic. The rotor 5 has a central bore 9 and a circumferential recess 13 having an inner wall 11. The circumferential recess 13 is engaged by a circumferential annular projection 15 of rectangular cross-section on the rotor shaft 3, the gap between the rotor body 5 and the rotor shaft 3 with the projection 15 being filled with an elastic layer 17 of Desmophane 487 of 250 μm (0.010 inch) thickness. In order to improve the adhesion of the elastic layer 17 to the projection 15 the projection 15 may be provided with a ribbed surface. The elastic layer 17 is thinner along the edge portions 19a and 19b of the rotor body 5 than in the recess 13, among other reasons to increase the radial stiffness.

Figure 2:
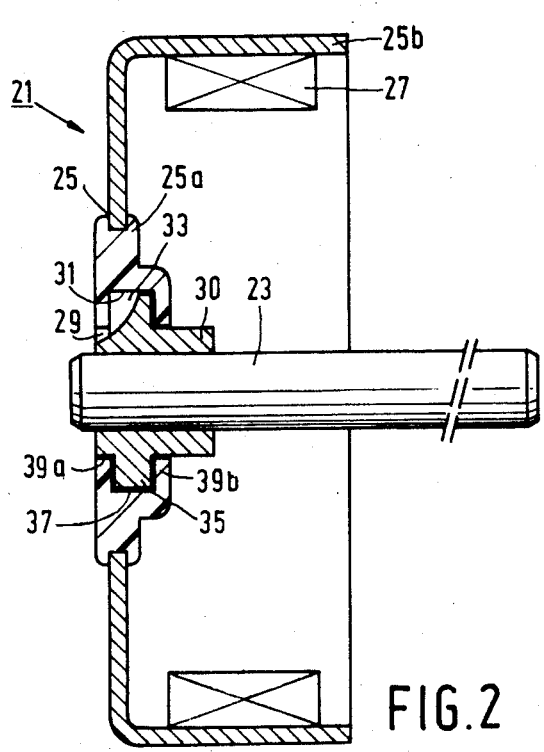
FIG. 2 is a sectional view of a rotor for use in a second embodiment.

Another embodiment of the invention is shown in FIG. 2. The rotor 21 has a rotor body 25 comprising a flange-shaped portion 25a made of acryl butadiene styrene mixed with polycarbonate and a cylindrical portion 25b of a metal. The rotor body 25 has a central bore 29 in which an aluminum hub 30 mounted on the comparatively long motor shaft 23 is situated. The inner surface 31 of the rotor body 25 has a circumferential channel or recess 33 which is engaged by a circumferential annular projection 35 on the hub 30. An elastic layer 37 of butyl rubber is interposed between the hub 30 and the rotor body 25. The layer 37, which is secured to the hub 30 and the rotor body 25, has portions 39a and 39b of smaller thickness along the inner edges of the rotor body 25.

The manner in which the rotor body 25 can be secured to the motor shaft 23 will now be described briefly.

During manufacture the elastic layer 37 is formed on the hub 30, after which acryl butadiene styrene mixed with polycarbonate is molded around the hub 30 with the layer 37. In this way the rotor portion 25 is formed and, moreover, the rotor portion 25b is attached. Subsequently, the hub 30 with the elastic layer 37 and the rotor body 25 is mounted on the motor shaft 23.

Figure 3:
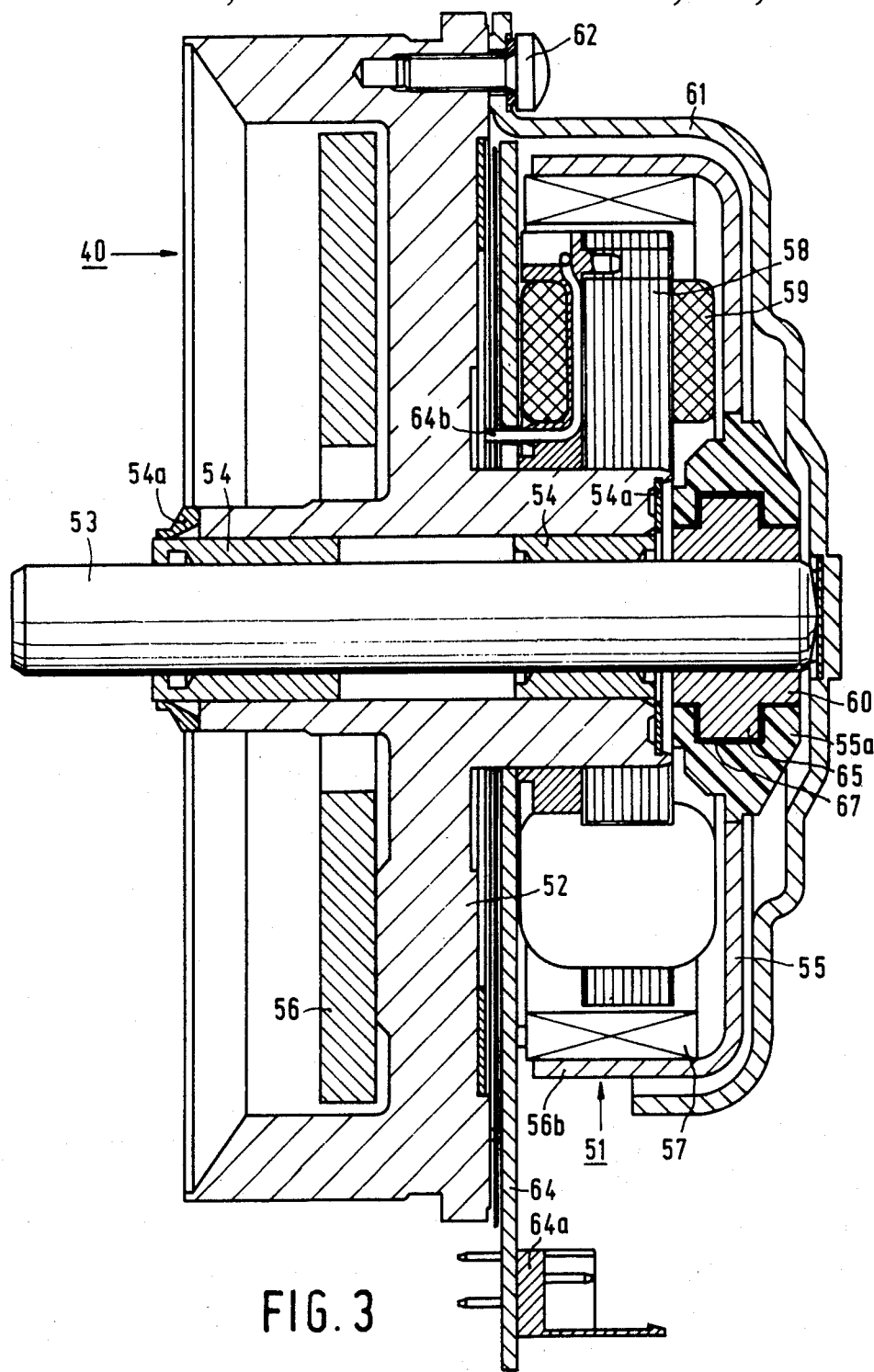
FIG. 3 is a longitudinal sectional view of an electric motor in accordance with the invention.

The electric motor 40 in accordance with the invention, shown in FIG. 3, may be be used in, for example, a video recorder for driving a head drum. The electric motor 40 comprises a rotor 51 with a rotor body 55, a stator 52, constructed as a stationary drum, and a motor shaft 53, which is journalled in this stator.

The stator 52 is provided with two bearings 54 for journalling the motor shaft 53. These bearings are retained by means of retaining rings 54a. The drawing also shows a rotary transformer 56 which is adapted to cooperate with a head drum. A laminated core 58 is secured to the stator and carries coil 59. A housing 61 secured to the stator 52 by means of bolts 62. This housing serves for shielding purposes and for axially supporting the motor shaft 53 by means of a thrust bearing 63. A p.c. board 64 is provided with a connector 64a, electrical wiring and supply leads for the power supply to the coils 59.

The rotor body 55 has a plastic mounting portion 55a and a metal cylindrical portion 55b whose inner side is provided with a radially magnetised cylindrical magnet 57 which cooperates with the coils. The rotor body 55 is mounted on a hub 60 which is non-rotatably secured to the motor shaft 53 and which comprises a circumferential projection 65. To secure the rotor 51 to the motor shaft 53 an elastic layer 67 of 250 μm (0.010 inch) thickness is interposed between the portion 55a of the rotor body 55 and the hub 60.

What is claimed is:

1. An electric motor, comprising a stator, a motor shaft, and a rotor mounted on the motor shaft,
    said rotor comprising a rotor body having a central bore, said shaft extending through said bore, and an elastic layer which connects the rotor body to said shaft,
    characterized in that said rotor body has a circumferential recess formed in said bore, said recess having a circumferential surface and a generally radially extending surface,
    said shaft comprises a circumferential annular projection disposed within said recess and a given radial height, said projection having a circumferential surface facing said recess circumferential surface, and a generally radially extending surface facing said recess generally radially extending surface, the radial distance between said circumferential surfaces and the axial distance between said facing generally radially extending surfaces each being less than said radial height, and
    said elastic layer is disposed at least between said circumferential surfaces and said generally radially extending surfaces, said elastic layer having a thickness which is small relative to the height of the circumferential projection.

2. A motor as claimed in claim 1, characterized by comprising a hub secured to the motor shaft, said annular projection forming part of said hub, the elastic layer being affixed to the rotor body and the hub.

3. An electric motor, comprising a stator, a motor shaft, and a rotor mounted on the motor shaft,
    said rotor comprising a rotor body having a central bore, said shaft extending through said bore, and an elastic layer which connects the rotor body to said shaft,
    characterized in that said rotor body has a circumferential recess formed in said bore, said recess having a circumferential surface and two generally radially extending surfaces,
    said shaft comprises a circumferential annular projection disposed within said recess and a given radial height, said projection having a circumferential surface facing said recess circumferential surface, and two generally radially extending surfaces respectively facing said recess generally radially extending surfaces, the radial distance between said circumferential surfaces and the axial distances between respective facing generally radially extending surfaces each being less than said radial height,
    said rotor body further comprising a respective edge portion disposed axially to each side of said recess, spaced from said shaft a radial distance less than the radial distance between said circumferential surfaces, and
    said elastic layer is disposed between said circumferential surfaces, said facing generally radially extending surfaces, and said rotor body edge portions and said shaft; and said elastic layer has a thickness which is small relative to said radial height, and a layer thickness between said edge portions and said shaft smaller than the layer thicknes in the recess.

4. A motor as claimed in claim 3, characterized by comprising a hub secured to the motor shaft, said annular projection forming part of said hub, the elastic layer being affixed to the rotor body and the hub, and
    said rotor body comprises a portion in which said recess is formed, said portion being made of a plastic material which is molded around the annular projection and elastic layer.

5. A motor as claimed in claim 4, characterized in that the thickness of the elastic layer is at the most 500 μm (0.020 inch).

6. A motor as claimed in claim 4, characterized in that said thickness is approximately 250 μm (0.010 inch) at its thickest parts.

7. A motor as claimed in claim 3, characterized in that the thickness of the elastic layer is at the most 500 μm (0.020 inch).

8. A motor as claimed in any one of claims 1–7, characterized in that the annular projection has an at least substantially rectangular cross-section.

9. A motor as claimed in claim 7, characterized in that said elastic layer is made of a thermoplastic polyurethane elastomer.

* * * * *